(12) United States Patent
Niebanck

(10) Patent No.: US 11,275,908 B2
(45) Date of Patent: *Mar. 15, 2022

(54) METHODS AND SYSTEMS FOR PROXY VOTING

(71) Applicant: Broadridge Investor Communication Solutions, Inc., Jersey City, NJ (US)

(72) Inventor: Robert Niebanck, Eastport, NY (US)

(73) Assignee: Broadridge Investor Communication Solutions, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,478

(22) Filed: Mar. 30, 2020

(65) Prior Publication Data

US 2020/0293723 A1    Sep. 17, 2020

Related U.S. Application Data

(63) Continuation of application No. 16/150,078, filed on Oct. 2, 2018, now abandoned, which is a continuation
(Continued)

(51) Int. Cl.
*G06F 40/58* (2020.01)
*G06F 3/0482* (2013.01)
*G06F 3/0484* (2013.01)
*G07C 13/00* (2006.01)
*G06Q 30/02* (2012.01)
(Continued)

(52) U.S. Cl.
CPC ............ *G06F 40/58* (2020.01); *G06F 3/0482* (2013.01); *G06F 3/0484* (2013.01); *G06F 16/9535* (2019.01); *G06F 40/157* (2020.01); *G06F 40/197* (2020.01); *G06Q 30/02* (2013.01); *G07C 13/00* (2013.01)

(58) Field of Classification Search
CPC ..... G07C 13/00; G07C 9/00039; G06F 40/58; G06F 16/9535; G06F 3/0482; G06F 3/0484; G06F 21/31; G06F 2221/2117; G06F 2212/154; H04L 67/18
See application file for complete search history.

(56) References Cited

U.S. PATENT DOCUMENTS 6,250,548 B1 * 6/2001 McClure ................ G07C 13/00
235/51
6,311,190 B1 * 10/2001 Bayer .................... G06Q 30/02
(Continued)

*Primary Examiner* — Nhat Huy T Nguyen
(74) *Attorney, Agent, or Firm* — Greenberg Traurig, LLP

(57) ABSTRACT

One embodiment of the present invention relates to electronic voting methods and systems that help simplify the management of institutional proxies. In one example, the methods and systems manage the process of meeting notifications, voting, tracking, mailing, reporting, record maintenance and/or vote disclosure rules enacted by the SEC. In one specific example, this is done for thousands of publicly traded securities custodied at various banks, brokers and global custodians. In another example, a system (and corresponding method) is provided for integrating, organizing and displaying (e.g., via a website) information in a language of preference for each user of the system. The information comprises meeting, agenda and/or ballot information and the users of the system/method is voting entities empowered to cast votes via the system.

12 Claims, 18 Drawing Sheets

Related U.S. Application Data of application No. 14/952,089, filed on Nov. 25, 2015, now abandoned, which is a continuation of application No. 13/871,222, filed on Apr. 26, 2013, now abandoned, which is a continuation of application No. 13/607,247, filed on Sep. 7, 2012, now abandoned, which is a continuation of application No. 13/117,663, filed on May 27, 2011, now Pat. No. 8,271,261, which is a continuation of application No. 11/674,949, filed on Feb. 14, 2007, now Pat. No. 7,953,589.

(60) Provisional application No. 60/773,529, filed on Feb. 15, 2006.

(51) Int. Cl.
*G06F 16/9535* (2019.01)
*G06F 40/157* (2020.01)
*G06F 40/197* (2020.01)

(56) References Cited

U.S. PATENT DOCUMENTS

| | | | | |
|---|---|---|---|---|
| 2002/0138341 A1* | 9/2002 | Rodriguez | ........... | G06Q 50/265 |
| | | | | 705/12 |
| 2003/0195798 A1* | 10/2003 | Goci | ............ | G06Q 10/10 |
| | | | | 235/386 |
| 2006/0081706 A1* | 4/2006 | Onischuk | ............ | G07C 13/00 |
| | | | | 235/386 |

* cited by examiner

METHODS AND SYSTEMS FOR PROXY VOTING

RELATED APPLICATIONS

This application is a continuation of U.S. patent application Ser. No. 16/150,078, filed Oct. 2, 2018, which is a continuation of U.S. patent application Ser. No. 14/952,089, filed Nov. 25, 2015, which is a continuation of U.S. patent application Ser. No. 13/871,222, filed Apr. 26, 2013, which is a continuation of U.S. patent application Ser. No. 13/607,247, filed Sep. 7, 2012, which is a continuation of U.S. Pat. No. 8,271,261, issued Sep. 18, 2012, which is a continuation of U.S. Pat. No. 7,953,589, issued May 31, 2011, which claims the benefit of U.S. Provisional Appln. No. 60/773,529, filed Feb. 15, 2006, which are incorporated herein by reference in their entirety.

FIELD OF THE INVENTION

One embodiment of the present invention relates to electronic voting methods and systems that help simplify the management of institutional proxies.

In one example, the methods and systems manage the process of meeting notifications, voting, tracking, mailing, reporting, record maintenance and/or vote disclosure rules enacted by the SEC. In one specific example, this may be done for thousands of publicly traded securities custodied at various banks, brokers and global custodians.

In another example, a system (and corresponding method) may be provided for integrating, organizing and displaying (e.g., via a website) information in a language of preference for each user of the system. The information may comprise meeting, agenda and/or ballot information and the users of the system/method may be voting entities empowered to cast votes via the system.

BACKGROUND OF THE INVENTION

There are various patents related to personalized/customized content delivery based on localization (e.g., languages). The following are a few examples: U.S. Pat. No. 7,149,964, issued Dec. 12, 1006 in the name of Cottrille et al.; U.S. Pat. No. 6,623,529, issued Sep. 23, 2003 in the name of Lakritz; U.S. Pat. No. 6,557,005, issued Apr. 29, 2003 in the name of Buget; U.S. Pat. No. 6,429,995, issued Dec. 10, 2002 in the name of Atkin et al.; and U.S. Pat. No. 6,345,293, issued Feb. 5, 2002 in the name of Chaddha.

BRIEF DESCRIPTION OF THE DRAWINGS

FIGS. 10-12 are website pages showing "Ballot List" screens (presented, respectively, in English, Japanese and German) according to an embodiment of the present invention;

FIGS. 13-15 are website pages showing "Vote Ballot" screens (presented, respectively, in English, Japanese and German) according to an embodiment of the present invention;

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Advisors and managers are typically required to comply with SEC regulations regarding their proxy voting procedures and record keeping. One embodiment of the present invention provides an Internet tool that helps such advisors and managers achieve compliance and streamline voting. In one example, the present invention may help advisors and managers to manage, track, reconcile and report proxy voting through electronic delivery of ballots, online voting, and SEC compliant reporting and record keeping (proxy information may, in one example, be provided through an automated electronic interface based on share positions provided directly to a system operator by various custodian bank(s)/broker(s)).

One embodiment of the present invention provides a system for integrating, organizing and displaying (e.g., via a website) information in a language of preference for each user of the system (see FIGS. 1-15 for examples of such displays according to various language preferences). In one example (which example is intended to be illustrative and not restrictive), the information may comprise meeting, agenda and/or ballot information. In another example (which example is intended to be illustrative and not restrictive), the language of preference for each user may be expressed by the user each time that the user signs on to the system. In another example (which example is intended to be illustrative and not restrictive), the language of preference for each user may be expressed by the user once, such as at the time of a first sign-on. In this latter example, the language of preference may then be used for that user for subsequent sign-ons (or until changed by the user). In another example (which example is intended to be illustrative and not restrictive), the users of the system may be voting entities empowered to cast votes via the system.

Figure 1:
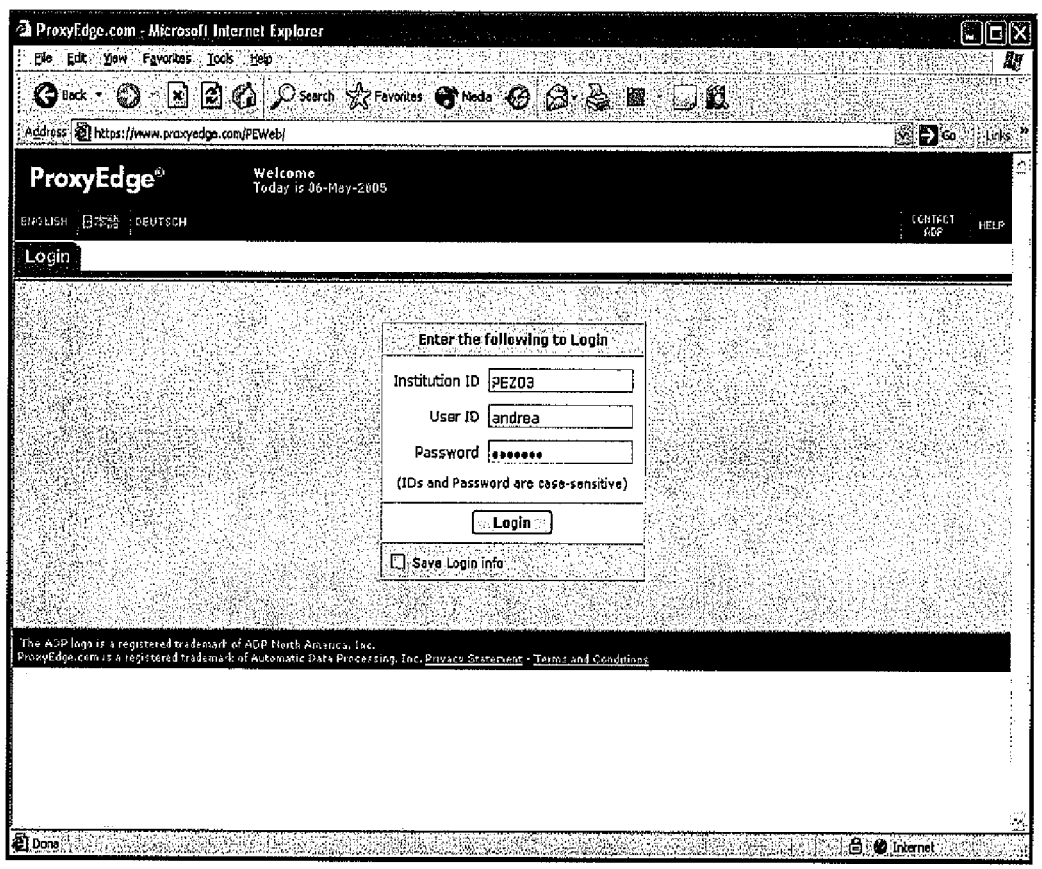
FIGS. 1-3 are website pages showing "login" screens (presented, respectively, in English, Japanese and German) according to an embodiment of the present invention.
Figure 2:
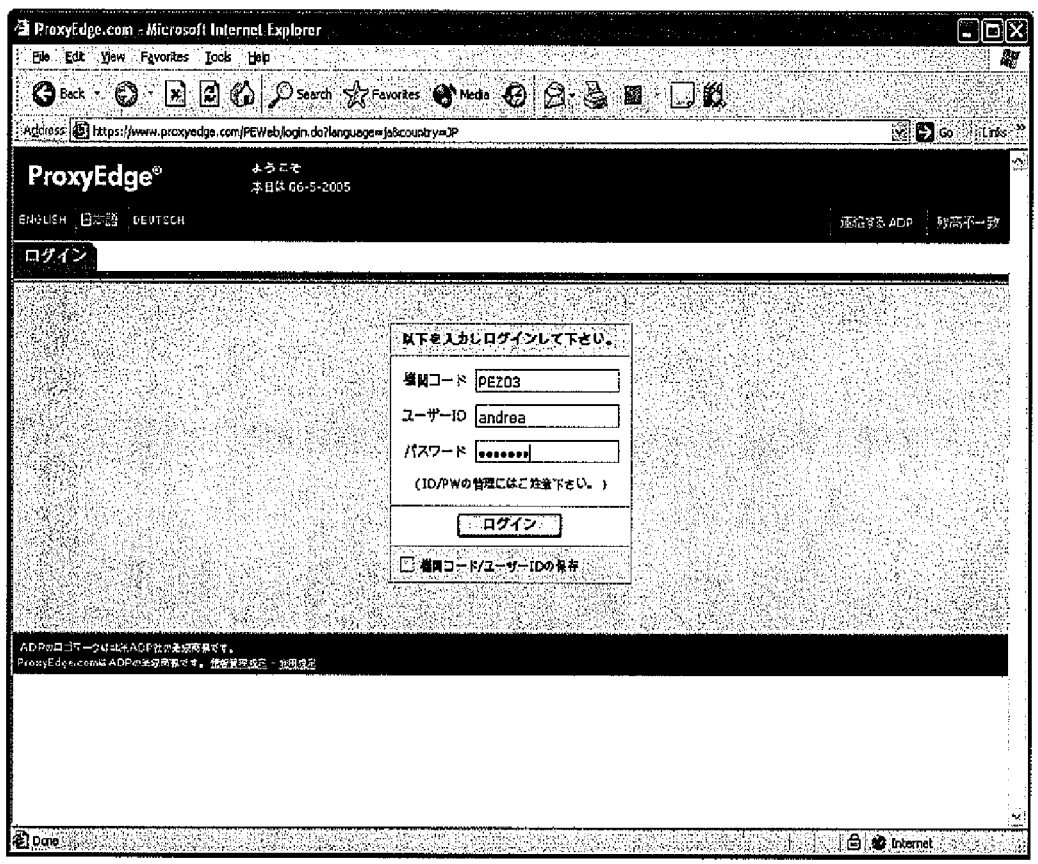
Figure 3:
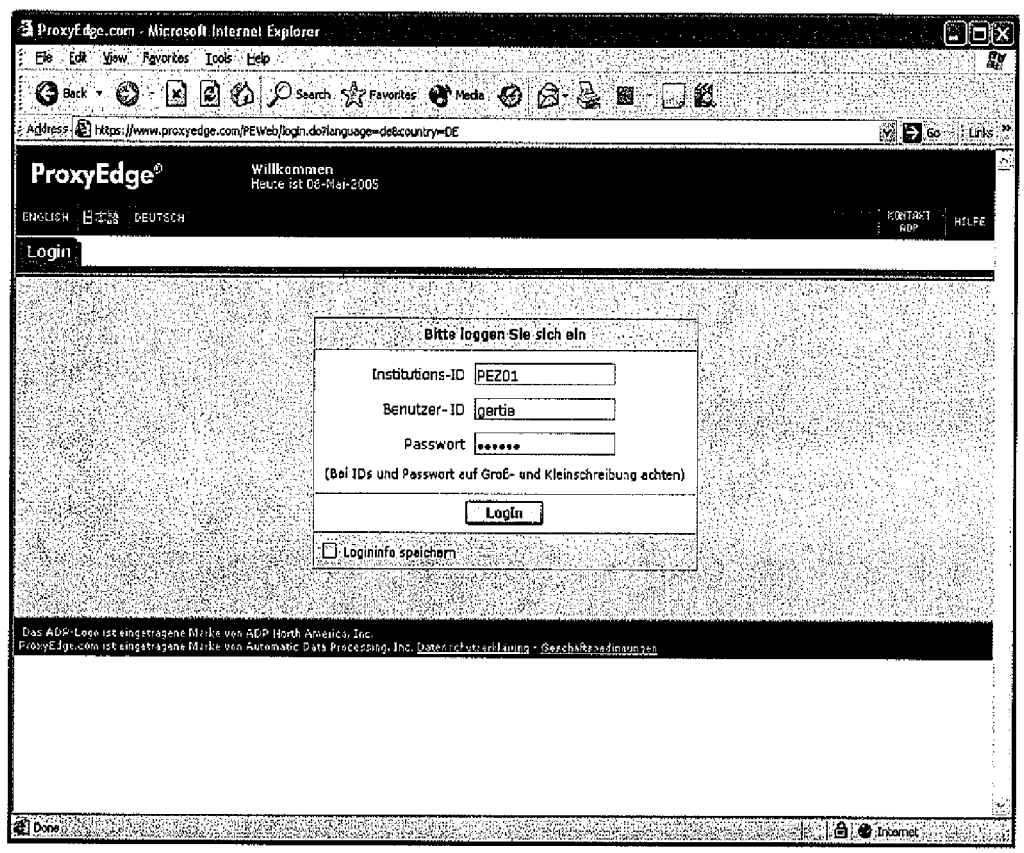

Referring now to FIGS. 1-3, website pages showing "login" screens (presented, respectively, in English, Japanese and German) according to an embodiment of the present invention are shown.

Of note, various graphical user interface elements incorporate the specific languages associated with each webpage. For example, FIG. 1 shows use of text entry box labels in English (see, e.g., "Institution ID", "User ID", "Password"), use of a command button caption in English (see, e.g., "Login"), use of a check box label in English (see, e.g., "Save Login Info") use of a tab element caption in English (see, e.g., "Login") and use of various text labels in English. FIGS. 2 and 3 show the corresponding elements in the respective languages.

Figure 4:
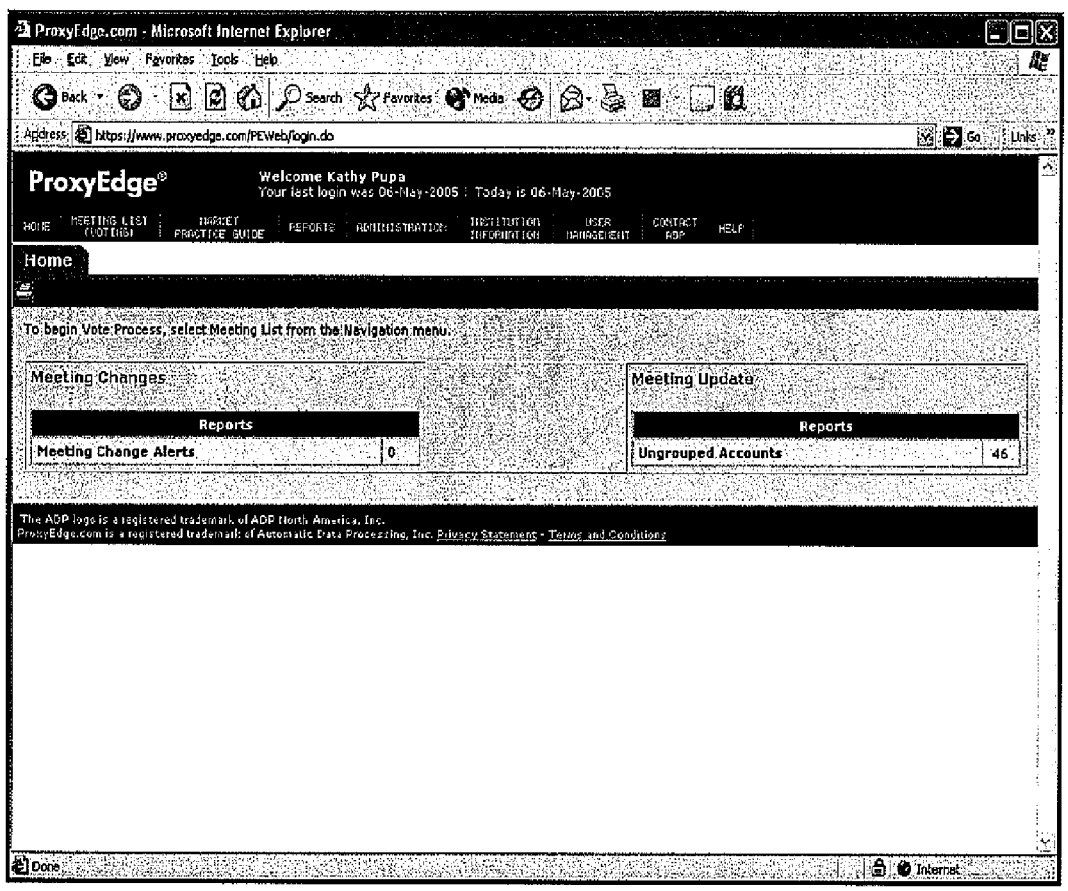
FIGS. 4-6 are website pages showing "home" screens (presented, respectively, in English, Japanese and German) according to an embodiment of the present invention.
Figure 5:
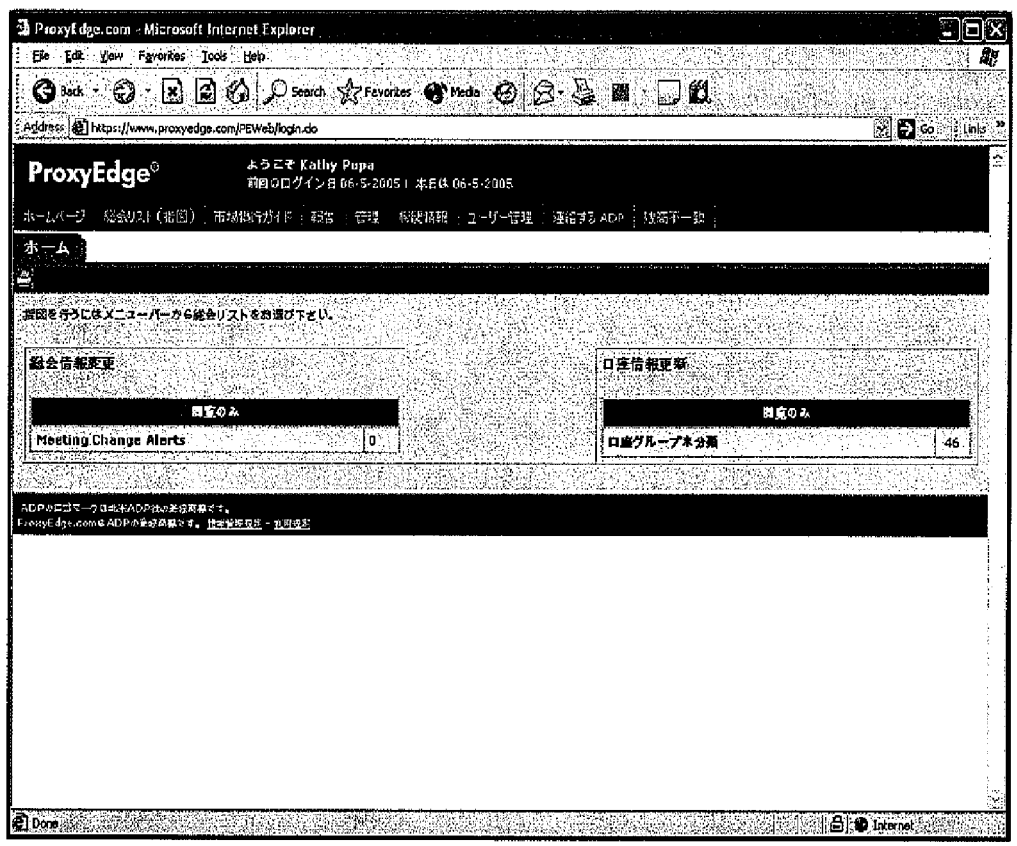
Figure 6:
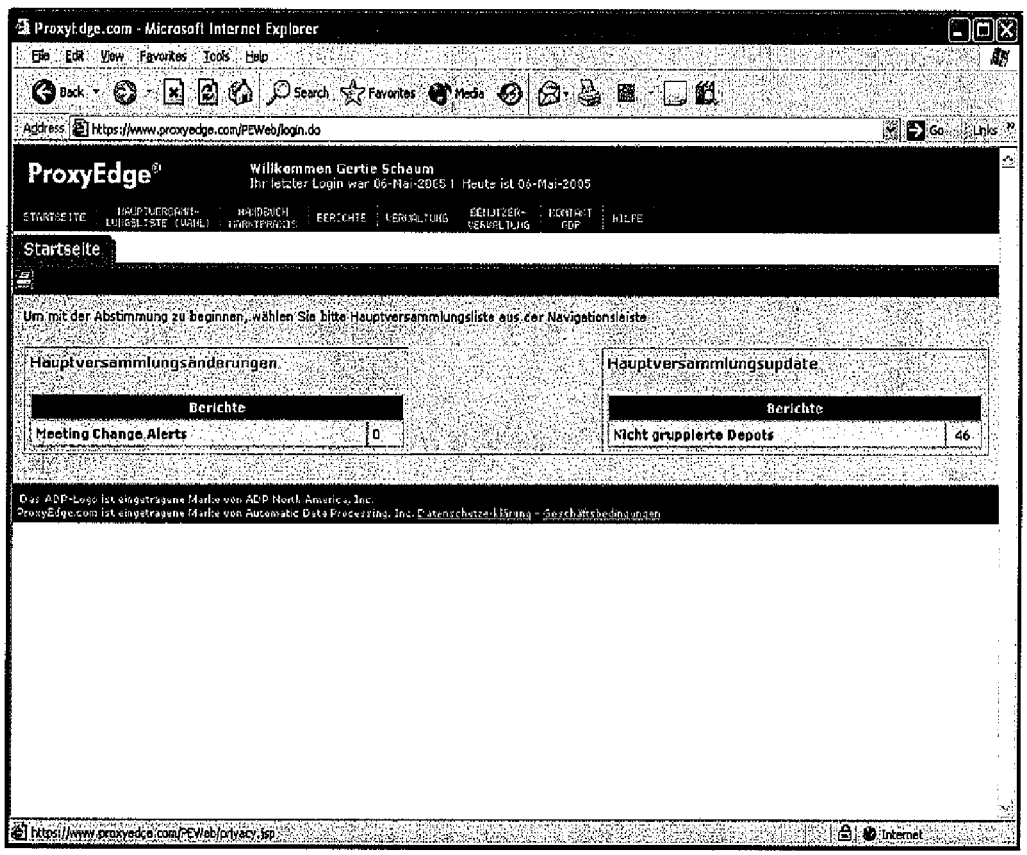

Referring now to FIGS. 4-6, website pages showing "home" screens (presented, respectively, in English, Japanese and German) according to an embodiment of the present invention are shown.

Again, various graphical user interface elements incorporate the specific languages associated with each webpage. For example, FIG. 4 shows use of various text labels in English and use of a tab element caption in English (see, e.g., "Home"). FIGS. 5 and 6 show the corresponding elements in the respective languages.

Figure 7:
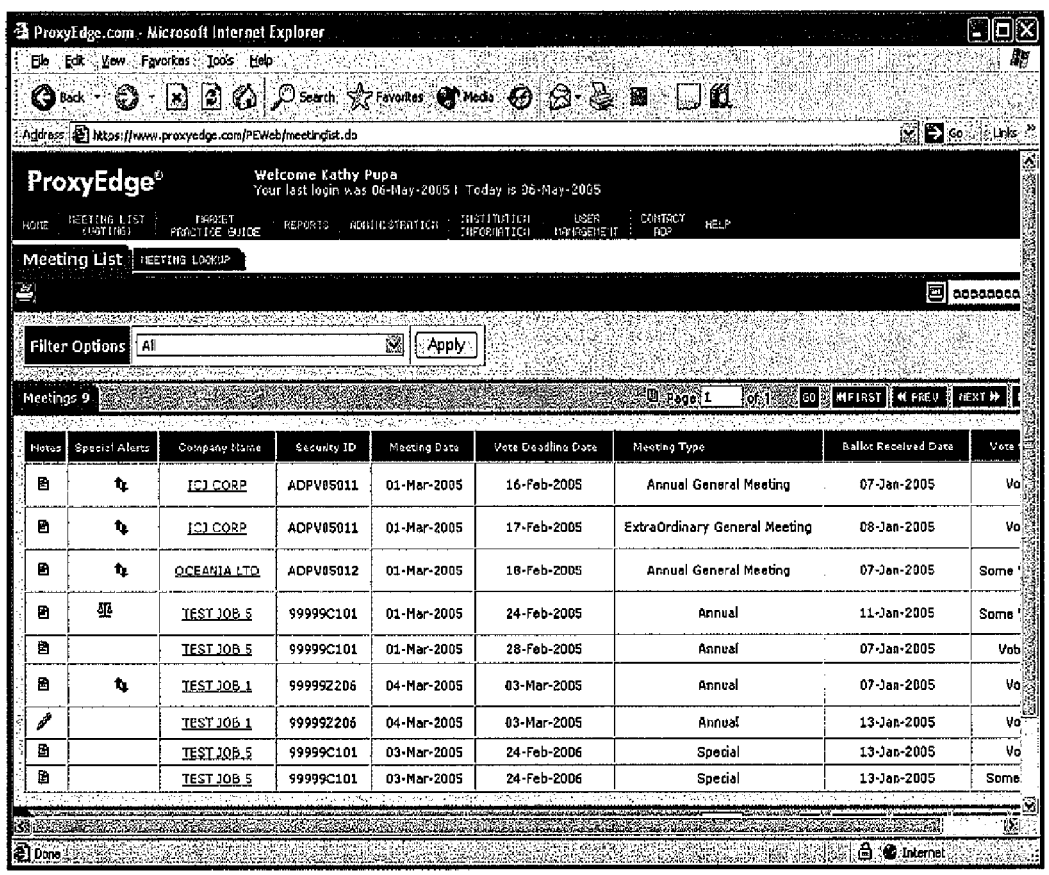
FIGS. 7-9 are website pages showing "Meeting List" screens (presented, respectively, in English, Japanese and German) according to an embodiment of the present invention.
Figure 8:
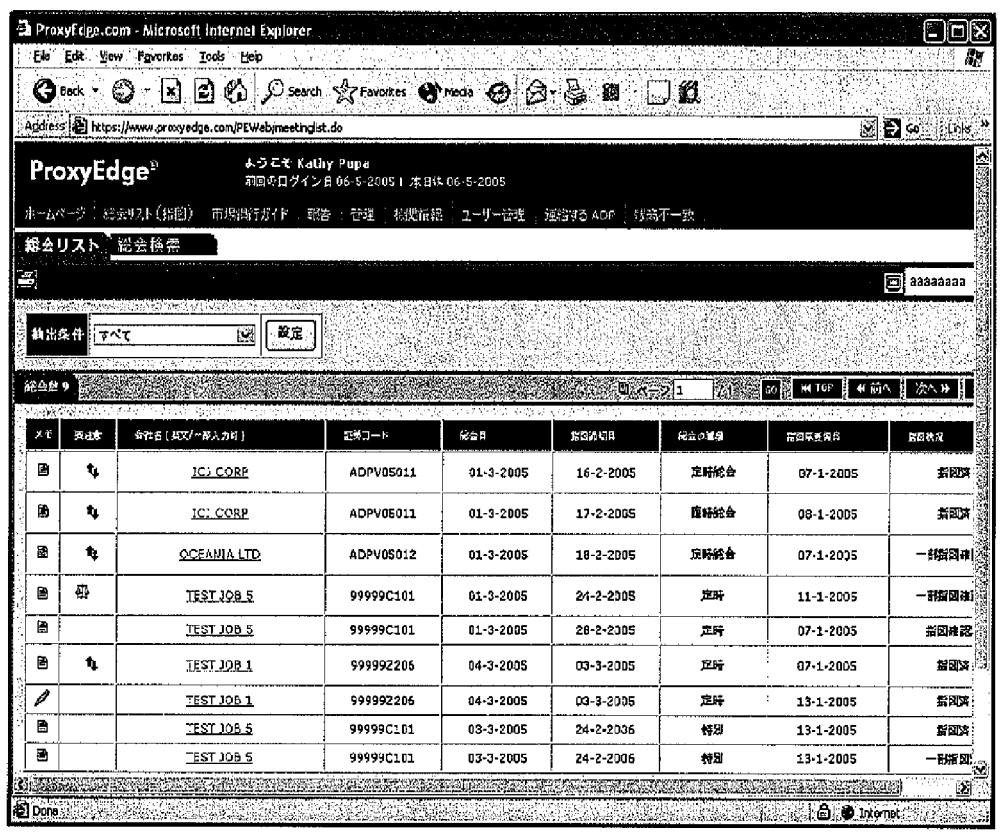
Figure 9:
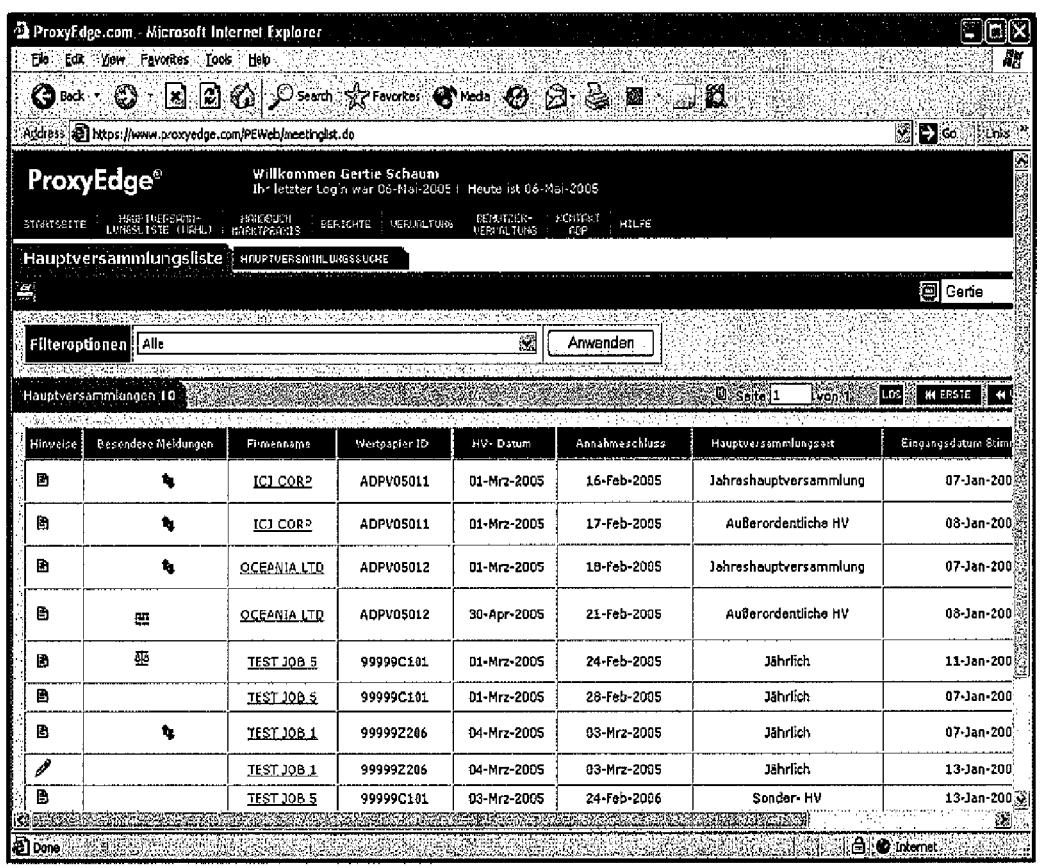

Referring now to FIGS. 7-9, website pages showing "Meeting List" screens (presented, respectively, in English, Japanese and German) according to an embodiment of the present invention are shown.

Again, various graphical user interface elements incorporate the specific languages associated with each webpage. For example, FIG. 7 shows use of a drop-down list box in English (see, e.g., "All"), use of a command button caption in English (see, e.g., "Apply"), use of text labels in English associated with the columns of the table, use of various table data in English, use of tab element captions in English (see, e.g., "Meeting List", "Meeting Lookup") and use of various text labels in English. FIGS. 8 and 9 show the corresponding elements in the respective languages.

Figure 10:
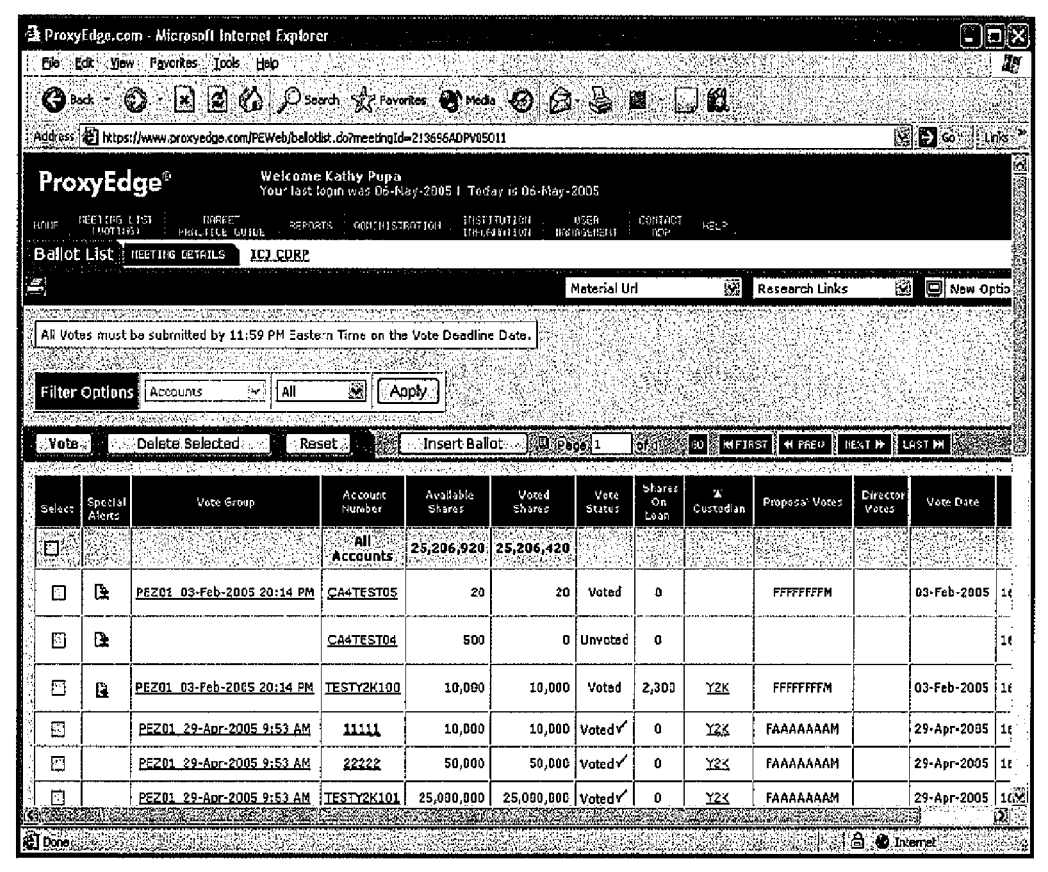
Figure 11:
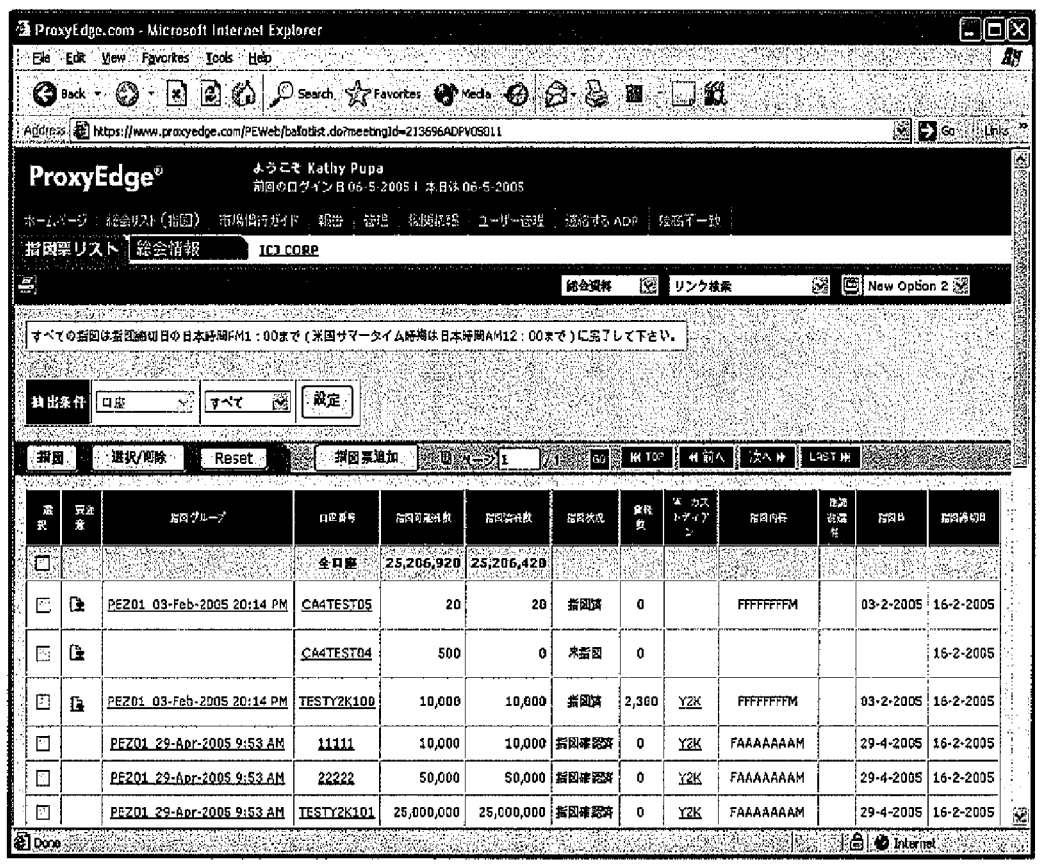
Figure 12:
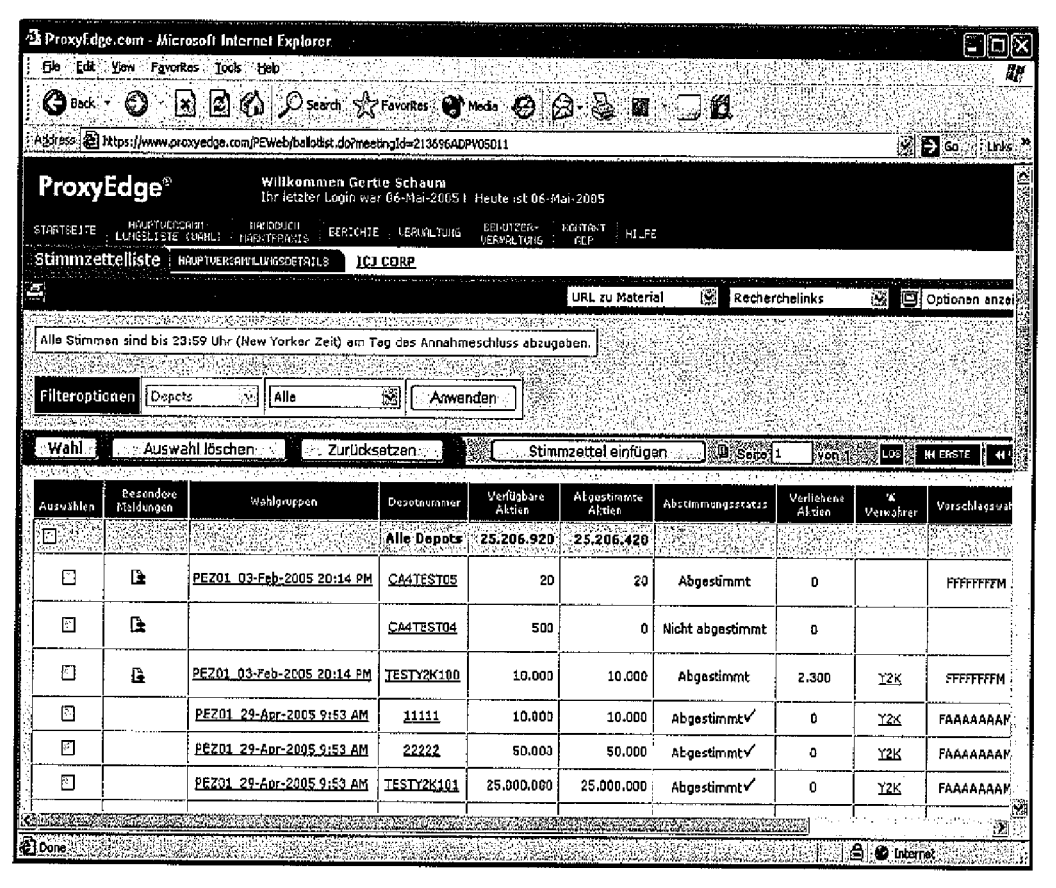

Referring now to FIGS. 10-12, website pages showing "Ballot List" screens (presented, respectively, in English, Japanese and German) according to an embodiment of the present invention are shown.

Again, various graphical user interface elements incorporate the specific languages associated with each webpage. For example, FIG. 10 shows use of drop-down list boxes in English (see, e.g., "Accounts" and "All"), use of a command button caption in English (see, e.g., "Apply"), use of text labels in English associated with the columns of the table, use of various table data in English, use of tab element captions in English (see, e.g., "Ballot List", "Meeting Details") and use of various text labels in English. FIGS. 11 and 12 show the corresponding elements in the respective languages.

Figure 13:
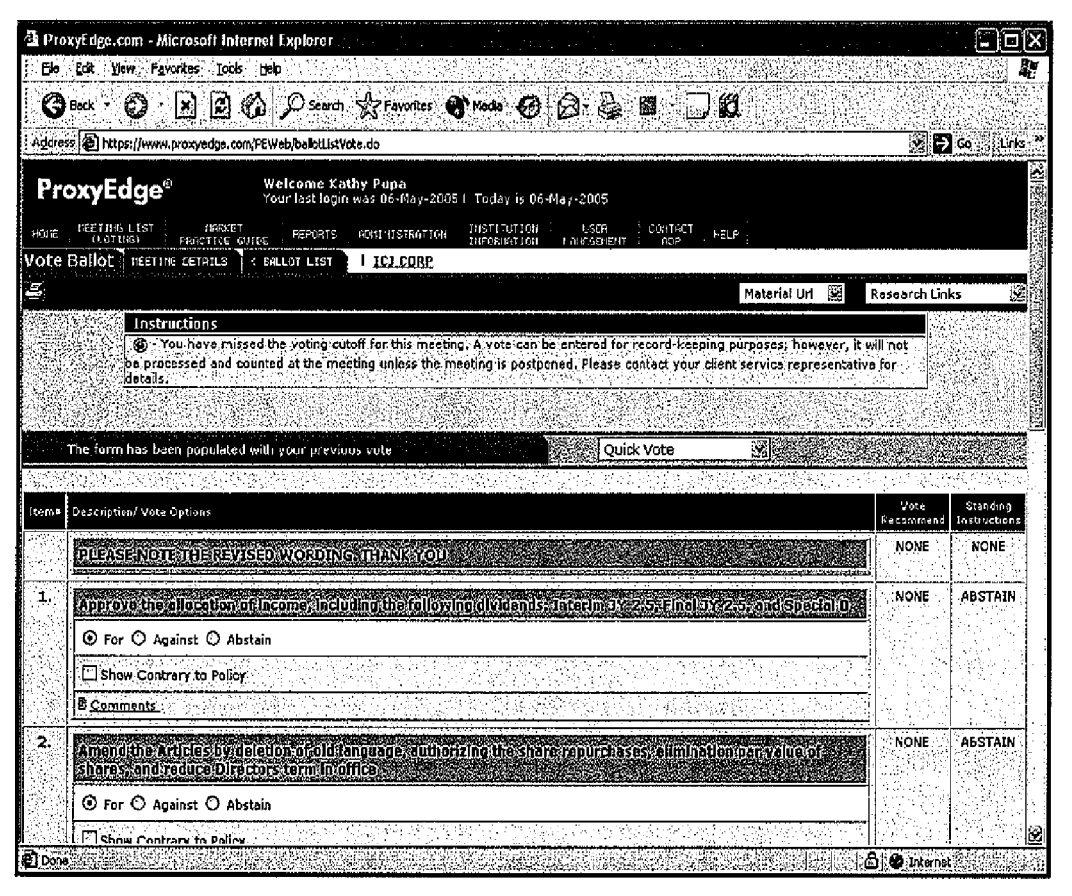
Figure 14:
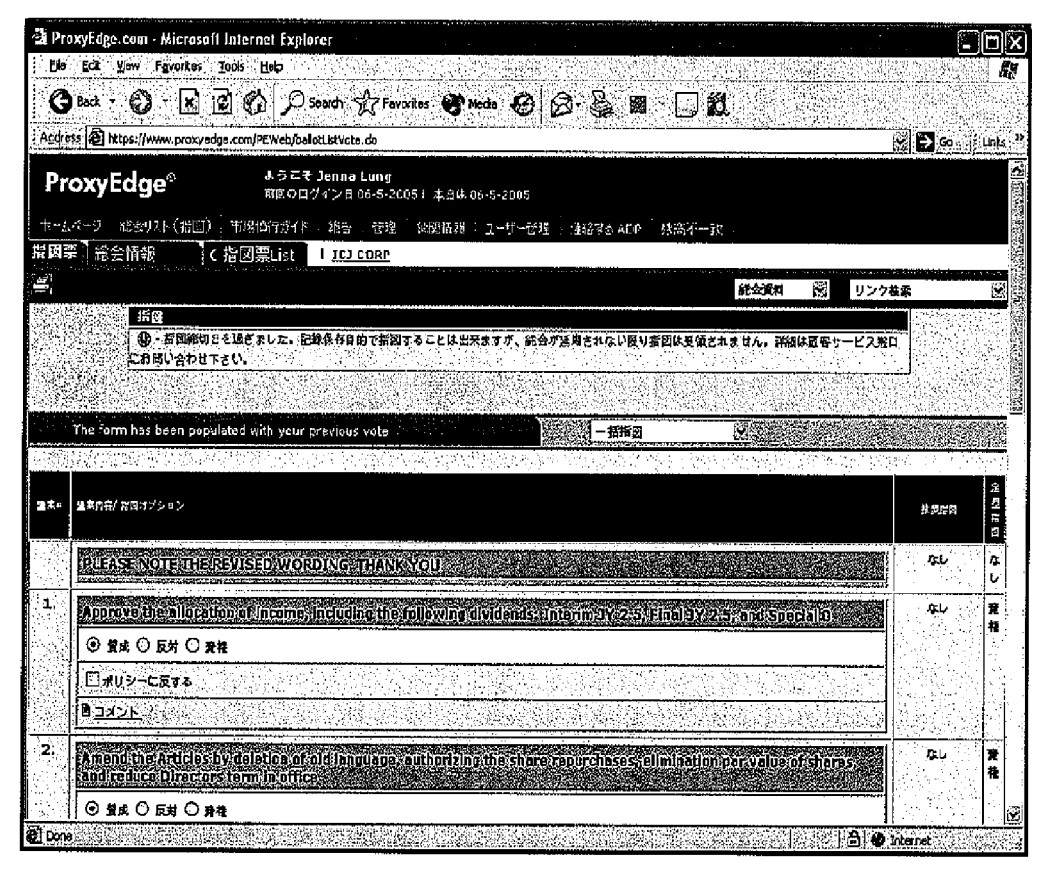
Figure 15:
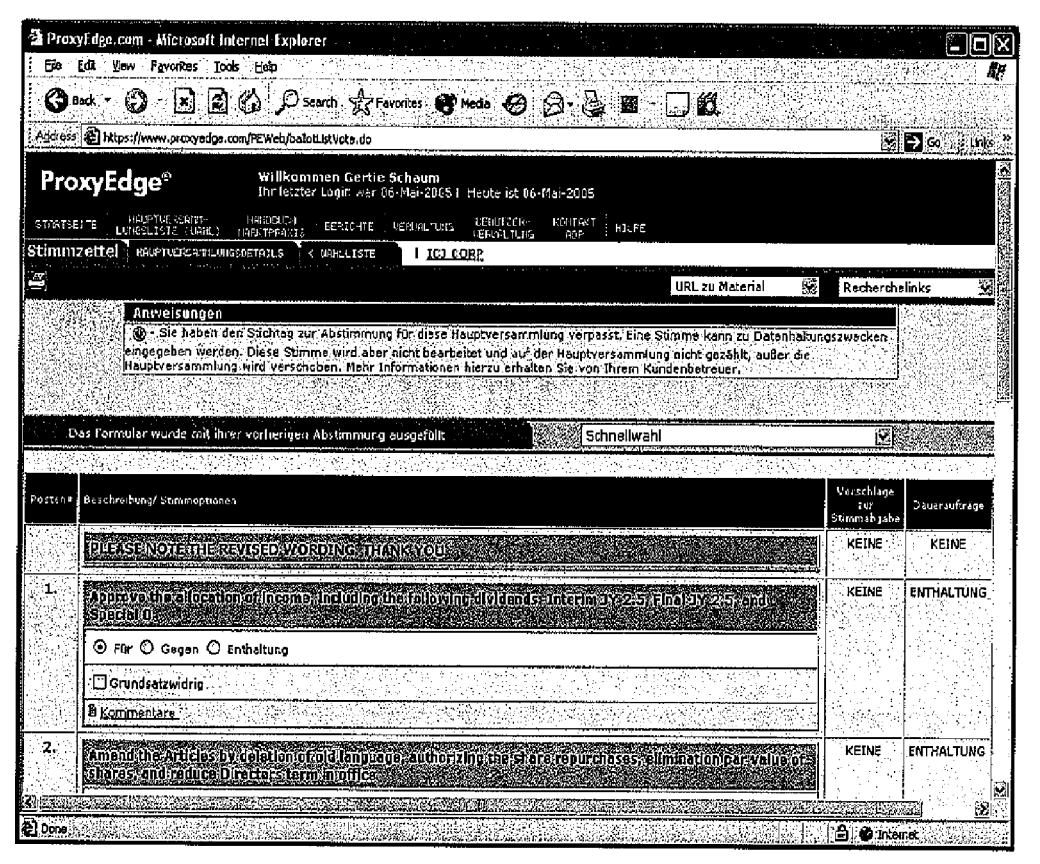

Referring now to FIGS. 13-15, website pages showing "Vote Ballot" screens (presented, respectively, in English, Japanese and German) according to an embodiment of the present invention are shown.

Again, various graphical user interface elements incorporate the specific languages associated with each webpage. For example, FIG. 13 shows use of drop-down list boxes in English (see, e.g., "Quick Vote"), use of radio button captions in English (see, e.g., "For", "Against", "Abstain"), use of check box text labels in English (see, e.g., "Show Contrary To Policy"), use of a hyperlink in English (see, e.g., "Comments"), use of text labels in English associated with the columns of the table, use of various table data in English, use of tab element captions in English (see, e.g., "Vote Ballot", "Meeting Details", "Ballot List") and use of various text labels in English. FIGS. 14 and 15 show the corresponding elements in the respective languages.

Of note, one embodiment of the present invention may use "message tokens" to identify various script items that need to be displayed. These message tokens may refer, for example, to specific rows in a translation database (wherein there is a column in the database for every language that the system needs to support). In this configuration, the application logic may be consistent for all applications across a given website (for example), but the language of the presentation can be tailored to the preference of any particular user at any particular time. To give one specific example of such tailoring of language preferences (which example is intended to be illustrative and not restrictive), the message token "pe.common.label.account" may call up "Account" to the screen if the language preference was English, the appropriate Japanese characters to the screen if the language preference was Japanese, and "Depot" to the screen if the language preference was German (the system would recognize that the content of the field was the account regardless of how it was described to the user).

In another embodiment of the present invention a method (e.g., a data processing method) may be provided. This method may include, but not be limited to: (a) tabularizing text elements into message tokens composed of a hierarchical string of descriptors including, but not limited to: application; page specific/common; content type; context; content key; (b) interpreting the message tokens to locate the row in a translation sheet database that identifies the interpretation of the text element in any supported language; (c) combining the message token and language preference indicator to select the column and row in the database to select the appropriate display; and (d) displaying the appropriate language on the application screen.

Again, in one specific example (which example is intended to be illustrative and not restrictive), the method may provide meeting, agenda and/or ballot information which may be used by voting entities in the language of their choice.

In other examples (which examples are intended to be illustrative and not restrictive), the invention may provide for the translation of any fixed body of information to be displayed electronically, statically, dynamically and/or interactively. Generic applications (e.g., global applications and/or help screens) can be developed independent of the language of presentation and additional languages can be added as needed (e.g., by inserting another column in the database).

Figure 16:
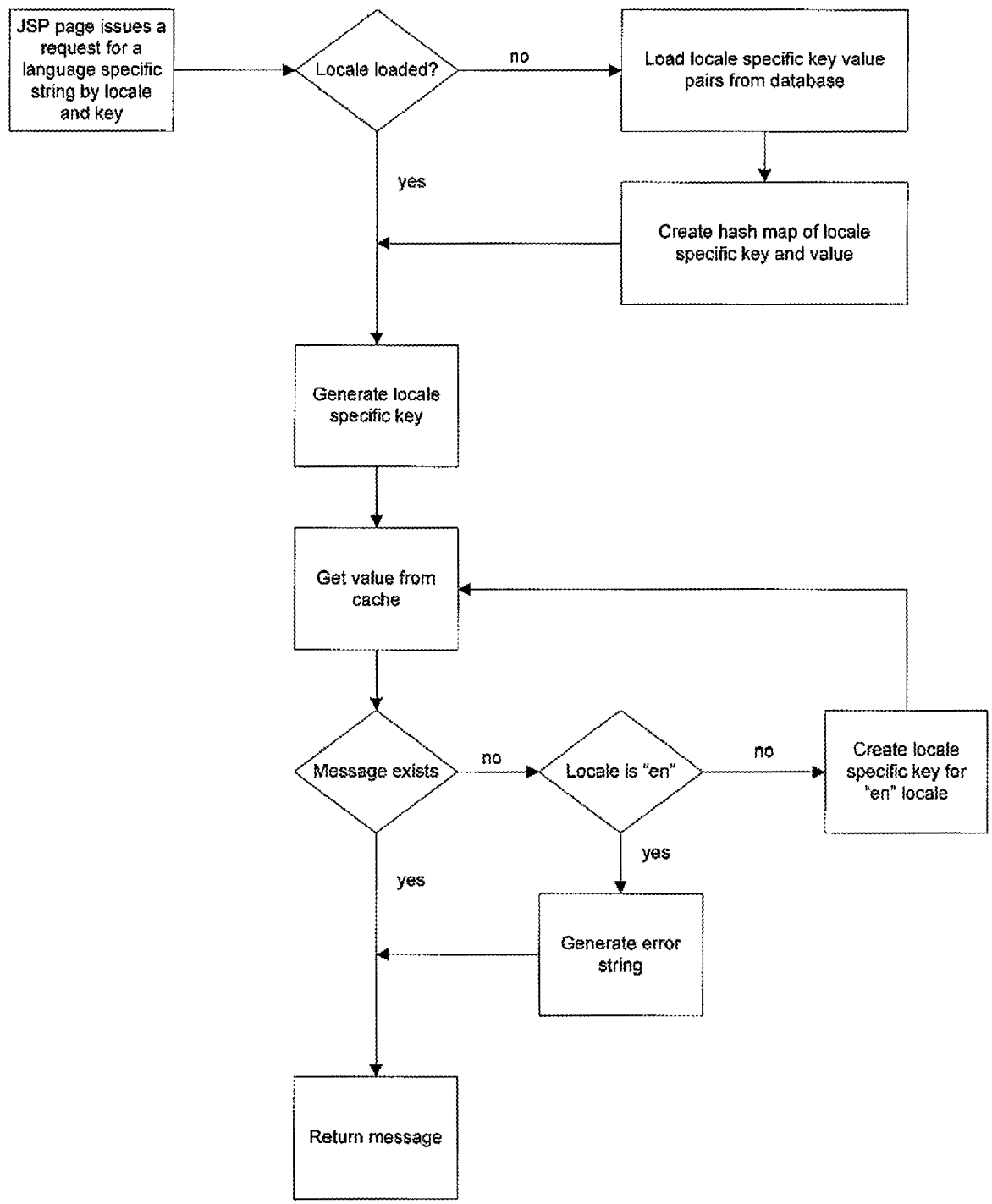
FIG. 16 shows a flowchart relating to building a language specific html page from a jsp template according to an embodiment of the present invention.

Referring now to FIG. 16, an example of building language specific html from a JavaServer Pages template is shown. More particularly, as seen in this FIG. 16, the following steps may be employed:

JSP page issues a request for a language specific string by locale (language preference) and key (message token)

Translation sheet program looks to see if that language is already loaded. If it is, the program drops through, picks up the text associated with the language specific key from the cache and returns it to the requesting JSP page.

If the language specific key is not loaded in the cache, the program gets the language specific key value pairs from the database and creates a hash map of the locale specific keys and values that is then loaded into cache for rapid access.

If no language specific text is in the database corresponding to the language specific key provided, the program will bring in the "English" text and present English as the default language for that particular message token to the JSP page for presentation. The remainder of the page will be in the user selected language if available.

If there is no "English" text and no language specific text for the locale of choice, the system will generate an error message string of "???message token???" and return it to the JSP page for presentation.

Figure 17:
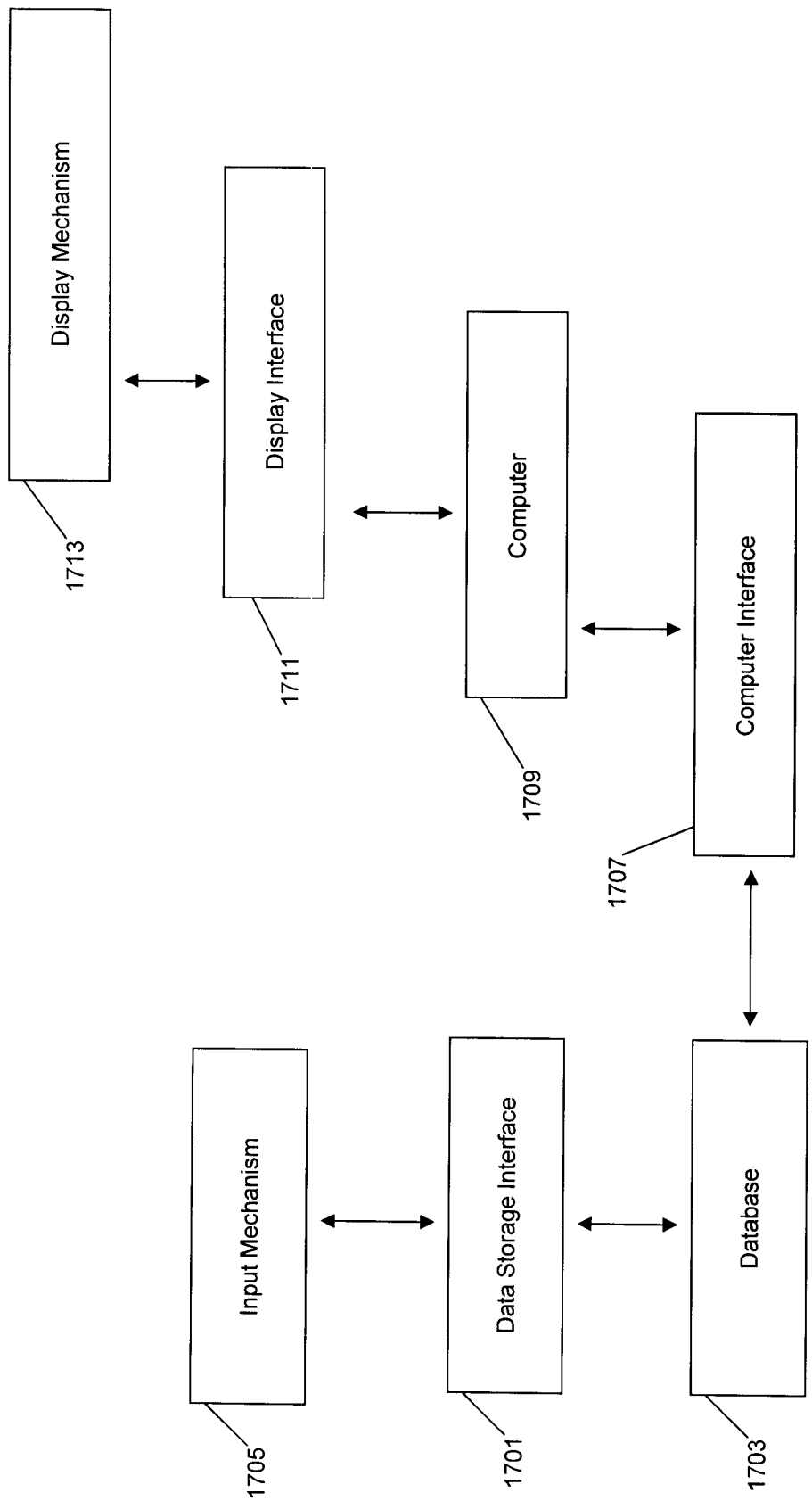
FIG. 17 shows a diagram of a computer device for presenting information associated with a website according to another embodiment of the present invention.

Referring now to FIG. 17, a computer device for presenting information associated with a website according to one embodiment of the present invention is shown. As seen in this FIG. 17, data storage interface 1701 (which may comprise, for example, a direct connection and/or a network such as the Internet and/or an intranet) is arranged and configured to be coupled between database 1703 (which may comprise one or more physical databases) and input mechanism 1705 (which may comprise, for example, a website, a dedicated terminal, and/or any other desired input mechanism).

Further, the data storage interface 1701 operates to receive data indicative of at least a first word in a first language and provide the data to the database 1703 and the data storage interface 1701 operates to receive data indicative of at least the first word in a second language and provide the data to the database 1703, wherein the second language is different from the first language.

Further still, computer interface 1707 (which may comprise, for example, a direct connection and/or a network such as the Internet and/or an intranet) is arranged and configured to be coupled between the database 1703 and computer 1709 (which may comprise, for example, one or more computer servers operating as website server(s)). The computer 1709 determines whether to display data to a user of the website in the first language or the second language (e.g., based on a preference set by the user and/or by a system administrator).

Further still, display interface 1711 (which may comprise, for example, a direct connection and/or a network such as the Internet and/or an intranet) is arranged and configured to be coupled between the computer 1709 and display mechanism 1713 (which may comprise, for example, a monitor displaying one or more webpages at one or more websites).

Computer 1709 displays on display mechanism 1713 via display interface 1711 the data indicative of the first word in the first language from database 1703 if it had been determined to display data to the user of the website in the first language; computer 1709 displays on display mechanism 1713 via display interface 1711 the data indicative of the first word in the second language from database 1703 if it had been determined to display data to the user of the website in the second language; and computer 1709 displays on display mechanism 1713 via display interface 1711 at least one graphical user interface element.

Of note, the display in the first language may comprise incorporating the stored data indicative of the first word in the first language into the graphical user interface element; and the display in the second language may comprise incorporating the stored data indicative of the first word in the second language into the graphical user interface element.

Figure 18:
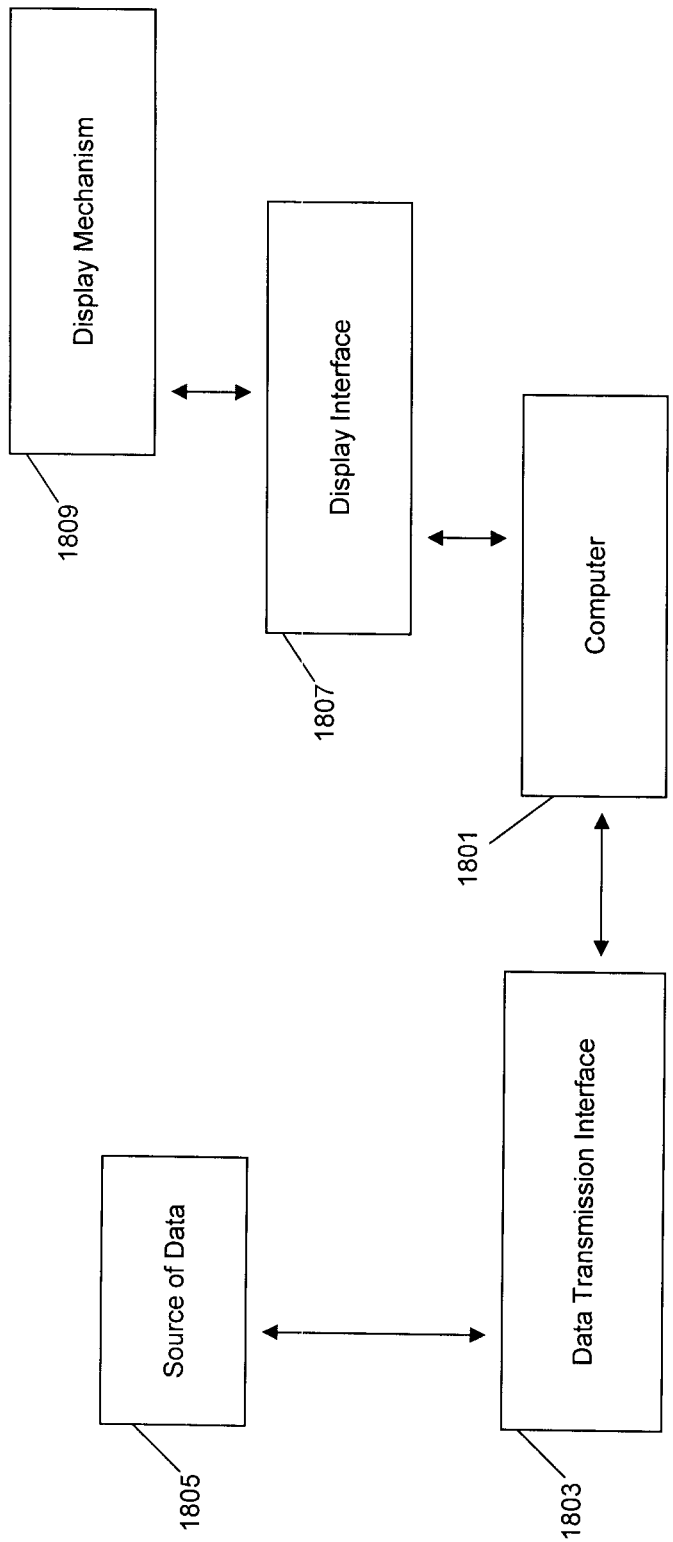
FIG. 18 shows a diagram of a computer device for presenting information associated with a website according to another embodiment of the present invention.

Referring now to FIG. 18, a computer device for presenting information associated with a website according to one embodiment of the present invention is shown. As seen in this FIG. 18, computer 1801 (which may comprise, for example, one or more computer servers operating as website server(s)) determines whether to display data to a user of the website in a first language or a second language, wherein the second language is different from the first language.

Further data transmission interface 1803 (which may comprise, for example, a direct connection and/or a network such as the Internet and/or an intranet) is arranged and configured to be coupled between source of data 1805 (which may comprise, for example, one or more physical databases, a mechanism for inputting data, and/or any other desired source(s) of data) and the computer 1801.

Further still, display interface 1807 (which may comprise, for example, a direct connection and/or a network such as the Internet and/or an intranet) is arranged and configured to be coupled between the computer 1801 and display mechanism 1809 (which may comprise, for example, a monitor displaying one or more webpages at one or more websites).

If it had been determined by the computer 1801 to display data to the user of the website in the first language, the following is performed: (i) obtaining data indicative of at least a first word in the first language, wherein the data is obtained from the source of data 1805 via the data transmission interface 1803; (ii) displaying on the display mechanism 1809 via the display interface 1807 the data indicative of the first word in the first language; and (iii) displaying on the display mechanism 1809 via the display interface 1807 at least one graphical user interface element.

If it had been determined by the computer 1801 to display data to the user of the website in the second language, the following is performed: (i) obtaining data indicative of at least the first word in the second language, wherein the data is obtained from the source of data 1805 via the data transmission interface 1803; (ii) displaying on the display mechanism 1809 via the display interface 1807 the data indicative of the first word in the second language; and (iii) displaying on the display mechanism 1809 via the display interface 1807 at least one graphical user interface element.

Of note, the display in the first language may comprise incorporating the obtained data indicative of the first word in the first language into the graphical user interface element; and the display in the second language may comprise incorporating the obtained data indicative of the first word in the second language into the graphical user interface element.

In another embodiment of the present invention the system may use essentially the same application logic (regardless of language display), but allow the presentation of the information to be sensitive to the language preference of the user and/or administrator and to the contextual differences between like expressions in different languages.

Of note, the present invention may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may be "computer implementable" or "computer implemented." In this regard, it is noted that while such methods can be implemented using a computer, the methods do not necessarily have to be implemented using a computer. Also, to the extent that such methods are implemented using a computer, not every step must necessarily be implemented using a computer. Further, the present invention may be used in the context of any desired number of different languages (the three presented herein are examples only). Further still, any desired number of users may be supported. Further still, any steps may be carried out in any desired order (and any desired steps may be added and/or any desired steps may be eliminated).

What is claimed is:

1. A computer implemented method for proxy voting, comprising:
    storing, by a first computer, a plurality of message tokens associated with a script;
    wherein each message token is a script element to be utilized to generate the script that is utilized, by a plurality of browser applications running on a plurality of second computers, to generate at least one graphical user interface of a website for proxy voting;
    wherein, when each browser application generates the at least one graphical user interface based on the script, the browser application utilizes an indication of a particular language-specific key to query the first computer to receive, into a cache, a hash map of a plurality of language-specific key value pairs for rapid access by the browser application to each textual interpretation in a particular language for each graphical user interface element corresponding to each message token of the plurality of message tokens of the script;
    wherein each language-specific key value pair of the plurality of language-specific key value pairs comprises a particular textual interpretation in the particular language and an indication of a corresponding message token of the script;
    storing, by the first computer, a plurality of language-specific interpretations associated with each message token and a plurality of language-specific keys;
    receiving, by the first computer, from a particular second computer of the plurality of second computers, when a particular browser application executes the script, a particular language-specific key associated with the particular language;
    generating, by the first computer, a particular hash map of a particular plurality of language-specific key value pairs based on the particular language-specific key, the script and a plurality of particular language textual interpretations in the particular language that corresponds to the plurality of message tokens in the script;
    transmitting, by the first computer, into a particular cache associated with the particular browser application running on the particular second computer, the particular hash map of the plurality of language-specific key value pairs to be utilized by the particular browser application for rapid access each textual interpretation in the particular language for each particular graphical user interface element corresponding to each message token of the plurality of message tokens of the script so as to generate at least one particular graphical user interface of the website for proxy voting in the particular language; and
    wherein each particular graphical user interface element is associated with at least one of meeting information, agenda information or ballot information.

2. The method of claim 1, wherein each particular graphical user interface element is selected from the group consisting of: (a) a text label for a text entry box; (b) a text label for a drop-down list box; (c) a text label for a drop-down combo box; (d) a text label associated with a column of a table; (e) a text label associated with a row of a table; (f) a text label for a radio button; (g) a text label for a check box; (h) a caption for a tab element; and (i) a caption for a command button.

3. The method of claim 1, wherein the particular language-specific key associated with the particular language is based on a selection made by the user.

4. The method of claim 3, wherein the selection made by the user occurs each time the user logs-on to the website.

5. The method of claim 3, wherein the selection made by the user occurs once and is then stored.

6. The method of claim 1, wherein the script is configured so that the particular browser application running on the particular second computer allows a user to subsequently change, for at least one portion of the website, having at least one particular graphical user interface element corresponding to a particular message token, from being displayed in the particular language to being displayed in another language, by re-sending, to the first computer, another language-specific key associated with the another language so as to receive, from the first computer, into the particular cache, an updated particular hash map of the plurality of language-specific key value pairs, having at least one value pair of another language-specific textual interpretation in the another language for at least one message token corresponding to the at least one particular graphical user interface element.

7. A computer-based system comprising:
    a computer;
    a first computer, having instructions stored in a non-transient computer memory;
    wherein, when executing the instructions, the first computer is programmed to:
        store a plurality of message tokens associated with a script;
        wherein each message token is a script element to be utilized to generate a script that is utilized, by a plurality of browser applications running on a plurality of second computers, to generate at least one graphical user interface of a web site for proxy voting;
        wherein, when each browser application generates the at least one graphical user interface based on the script, the browser application utilizes an indication of a particular language-specific key to query the first computer to receive, into a cache, a hash map of a plurality of language-specific key value pairs for rapid access by the browser application to each textual interpretation in a particular language for each graphical user interface element corresponding to each message token of the plurality of message tokens of the script;
        wherein each language-specific key value pair of the plurality of language-specific key value pairs comprises a particular textual interpretation in the particular language and an indication of a corresponding message token of the script;

store a plurality of language-specific interpretations associated with each message token and a plurality of language-specific keys;

receive, from a particular second computer of the plurality of second computers, when a particular browser application executes the script, a particular language-specific key associated with the particular language;

generating, by the first computer, a particular hash map of a particular plurality of language-specific key value pairs based on the particular language-specific key, the script and a plurality of particular language textual interpretations in the particular language that corresponds to the plurality of message tokens in the script;

transmitting, by the first computer, into a particular cache associated with the particular browser application running on the particular second computer, the particular hash map of the plurality of language-specific key value pairs to be utilized by the particular browser application for rapid access each textual interpretation in the particular language for each particular graphical user interface element corresponding to each message token of the plurality of message tokens of the script so as to generate at least one particular graphical user interface of the website for proxy voting in the particular language; and wherein each particular graphical user interface element is associated with at least one of meeting information, agenda information or ballot information.

8. The computer-based system of claim 7, wherein each particular graphical user interface element is selected from the group consisting of: (a) a text label for a text entry box; (b) a text label for a drop-down list box; (c) a text label for a drop-down combo box; (d) a text label associated with a column of a table; (e) a text label associated with a row of a table; (f) a text label for a radio button; (g) a text label for a check box; (h) a caption for a tab element; and (i) a caption for a command button.

9. The computer-based system of claim 7, wherein the indication of the particular language-specific key associated with the particular language is based on a selection made by the user.

10. The computer-based system of claim 9, wherein the selection made by the user occurs each time the user logs-on to the website.

11. The computer-based system of claim 9, wherein the selection made by the user occurs once and is then stored.

12. The computer-based system of claim 7, wherein the script is configured so that the particular browser application running on the particular second computer allows a user to subsequently change, for at least one portion of the website, having at least one particular graphical user interface element corresponding to a particular message token, from being displayed in the particular language to being displayed in another language, by re-sending, to the first computer, another language-specific key associated with the another language so as to receive, from the first computer, into the particular cache, an updated particular hash map of the plurality of language-specific key value pairs, having at least one value pair of another language-specific textual interpretation in the another language for at least one message token corresponding to the at least one particular graphical user interface element.

* * * * *